United States Patent [19]

Nishikata et al.

[11] Patent Number: 5,472,244
[45] Date of Patent: Dec. 5, 1995

[54] PLASTIC COUPLING FOR PLASTIC TUBING

[75] Inventors: Yasukatsu Nishikata, Funabashi; Hidenori Maeba, Takaoka; Takao Nakazawa, Tokyo, all of Japan

[73] Assignees: Nisso Engineering Co., Ltd, Japan; Fluoroware, Inc., Chaska, Minn.

[21] Appl. No.: 282,791

[22] Filed: Jul. 29, 1994

[30] Foreign Application Priority Data

Aug. 4, 1993 [JP] Japan .................. 5-046423

[51] Int. Cl.$^6$ .................. F16L 39/00
[52] U.S. Cl. .................. 285/321; 285/38; 285/334.5; 285/354; 285/369; 285/423
[58] Field of Search .................. 285/354, 334.5, 285/38, 369, 423

[56] References Cited

U.S. PATENT DOCUMENTS

| | | |
|---|---|---|
| 2,289,382 | 7/1942 | Parker . |
| 2,515,219 | 7/1950 | Harding .................. 285/334.5 |
| 2,517,706 | 8/1950 | Paquin . |
| 2,549,741 | 4/1951 | Young .................. 285/334.5 |
| 3,334,773 | 8/1967 | Bimba .................. 285/334.5 X |
| 4,681,352 | 7/1987 | Sundholm . |
| 4,750,765 | 6/1988 | Cassidy et al. .................. 285/354 X |
| 5,074,599 | 12/1991 | Wirbel et al. .................. 285/354 X |
| 5,131,145 | 7/1992 | Badoureaux . |
| 5,332,271 | 7/1994 | Grant et al. .................. 285/334.5 |

FOREIGN PATENT DOCUMENTS

| | | |
|---|---|---|
| 414891 | 2/1992 | Japan . |
| 671749 | 3/1994 | Japan . |
| 286734 | 2/1965 | Netherlands . |

OTHER PUBLICATIONS

Japan Publication 6–71749 is believed to have been published on 15 Mar., 1994 and is not admitted to be prior art. An English translation was filed as U.S. Appln. S.N. 917,460, filed Jul. 21, 1992, now abandoned, a copy of which is attached.

*Primary Examiner*—Dave W. Arola
*Attorney, Agent, or Firm*—Palmatier, Sjoquist & Helget

[57] ABSTRACT

A plastic coupling for plastic tubing having a groove annulus formed between a first circumferential groove on the outer periphery of the enlarged diameter portion of a connection tube and a second circumferential groove on the inner periphery of a cap nut 5 when the cap nut 5 is mounted on a joint body, and an enlargeable split ring having an internal diameter smaller than the external diameter of the enlarged diameter portion and loosely fitted into the second groove, the split ring being adapted to slide on the enlarged diameter portion to the first groove until the split ring falls within the first groove and is located within the groove annulus when the cap nut is mounted on the joint body.

5 Claims, 7 Drawing Sheets

PLASTIC COUPLING FOR PLASTIC TUBING

BACKGROUND OF THE INVENTION

The present invention relates to a plastic coupling for plastic tubing for connecting two tubes. For example, the semiconductor manufacturers use a great amount of various chemicals with a great amount of pure water. With automation of the manufacturing process, it is required to move the chemicals and pure water through a great variety of measures such as pumps, pressurized gas and the like, depending on the purpose. Therefore, they must use tubes and joints made of fluoroplastics which are stable to chemicals and resistant to heat.

It is essential that piping members for these tubes and joints are not simply disconnected under the temperature and pressure of the liquid being transferred. To meet this requirement, various types of joint structures have been proposed and practically used.

Figure 9:
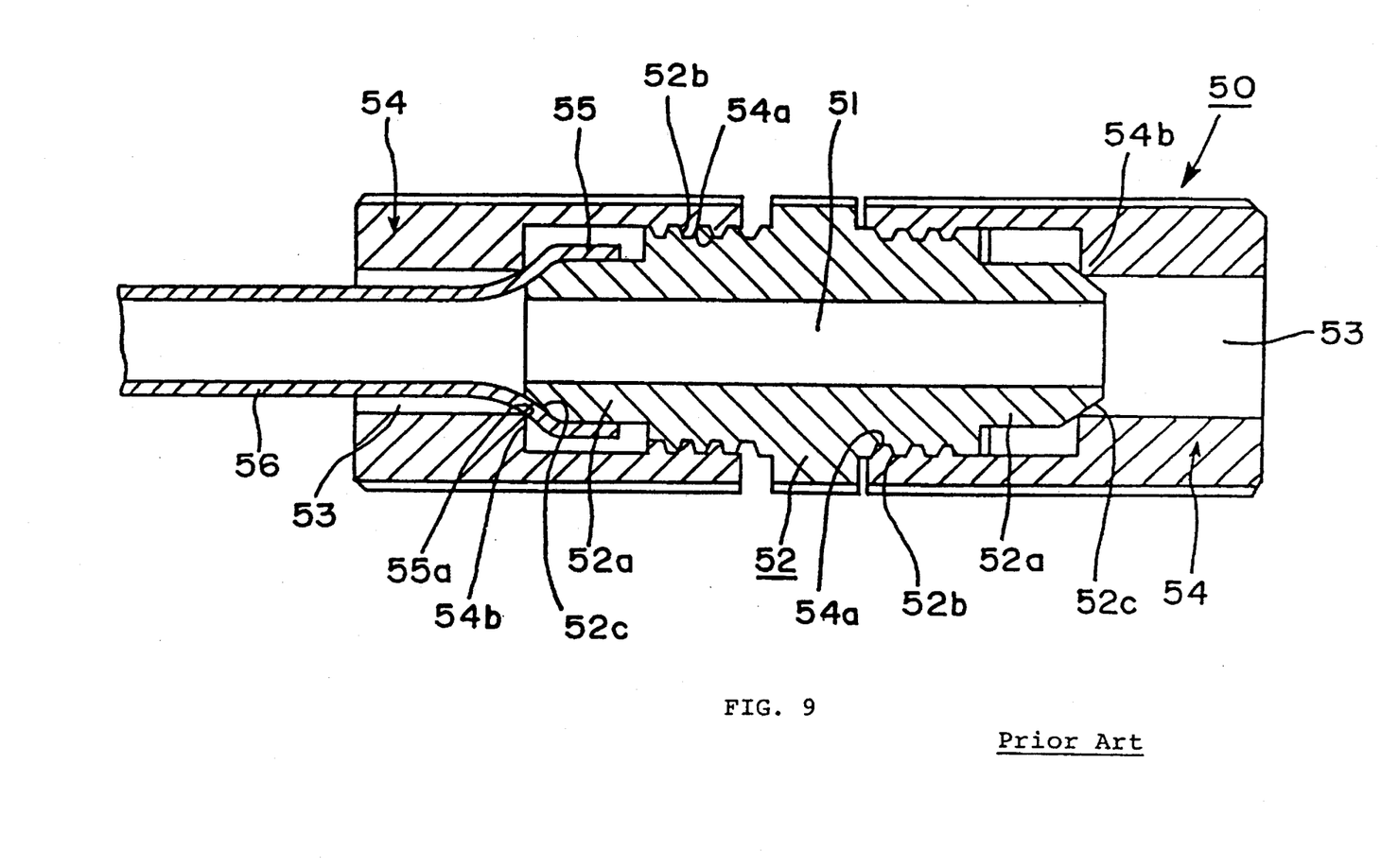
FIG. 9 is a side cross-sectional view of a plastic coupling constructed in accordance with the prior art.
Figure 11:
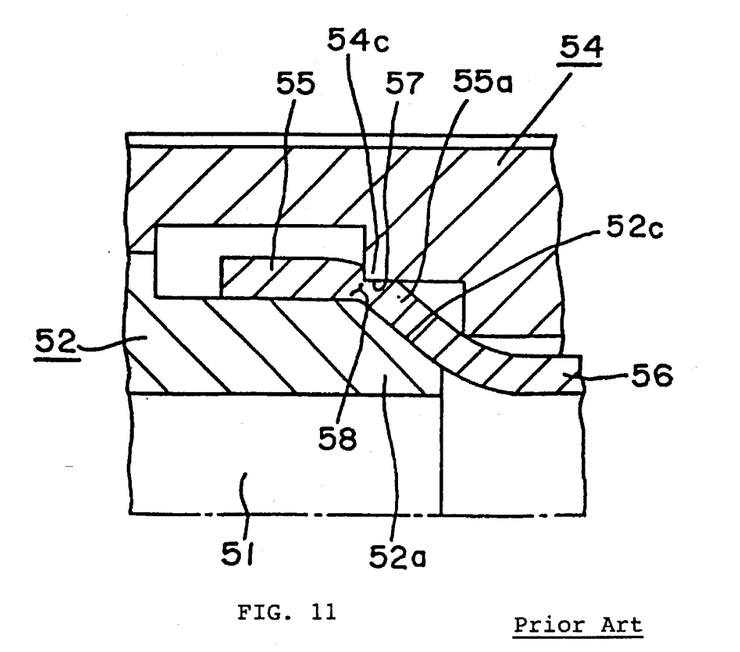
FIG. 11 is a detail section view showing the primary parts of another prior art plastic coupling, illustrating the problem therein.

FIGS. 9 and 11 show a plastic coupling used in the prior art. The plastic coupling 50 comprises a main joint body 52 having a central fluid passages 51, a pair of tube fixing nuts 54 screwed over the joint body 52 at the opposite ends, each of said tube fixing nuts 54 having a tube end receiving bore 53 aligned with the fluid passage 51 of the joint body 52, and a plastic connection tube 56 having an enlarged diameter portion 55 with a flared tip end.

When the connection tube 56 is to be connected to the joint body 52, the sleeve portion 52a of the joint body 52 is first sealingly fitted into the enlarged diameter portion 55. The nut 54 is then removed to a position in which it covers the enlarged diameter portion 55. The female or internal thread 54a of the nut 54 is further screwed onto the male or external thread 52b of the joint body 52.

When the female thread 54a is fully screwed onto the male thread 52b, the shoulder of the reduced diameter portion 54b in the nut 54 is engaged by the tapered portion 55a of the enlarged diameter portion 55 while the tapered portion 55a is urged against the tip tapered portion 52c of the sleeve portion 52a. Thus, the tapered portion 55a will be clamped between the joint body 52 and the nut 54.

Although not shown in FIG. 9, another similar tube 56 will be mounted in the right-hand end of the joint body 52.

Figure 10:
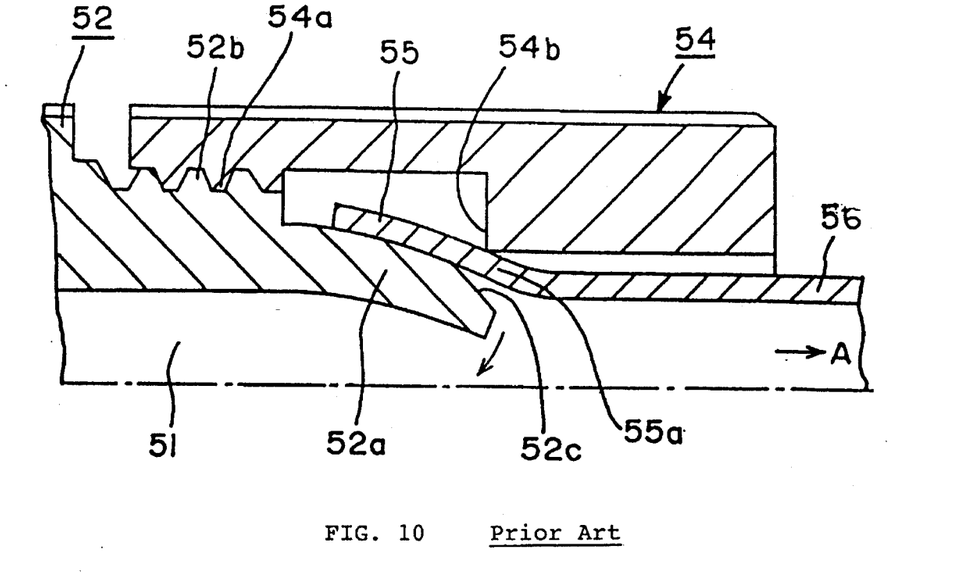
FIG. 10 is a view illustrating the problems in the plastic coupling of the prior art coupling of FIG. 9.

In the plastic coupling of the prior art, however, the connected tubes 56 may easily be removed out of the joint body 52 when the tubes are pulled in the longitudinal direction. Particularly, when the joint body 52 is formed of fluoroplastic and if it is used in transfer of any liquid having a temperature equal to or higher than 100° C., the sleeve portion 52a of the joint body 52 tends to be inwardly deformed as shown in FIG. 10 because the fluoroplastic material has a very large expansion coefficient. With such a deformation, the clamping force by which the connection tube 56 is held between the joint body 52 and the nut 54 will be reduced. If a large external pulling force is applied to the connection tube 56 in the longitudinal direction (as shown by arrow A in FIG. 10), it may easily be removed out of the joint body.

In order to overcome the above problem, an improvement has been proposed which as shown in FIG. 11, the tapered portion 55 of the connection tube 56 is formed with a groove 57 while another reduced diameter portion 54c is formed in the inner wall of the nut 54 at a position corresponding to the groove 57. When the shoulder of the reduced diameter portion 54c in the nut 54 is engaged by the groove 57, a further engagement for preventing the tube from being removed out of the joint body may be provided.

However, such a further engagement cannot fully prevent the tube from being removed out of the joint body when the latter is used in the increased temperature as mentioned. When the engaging groove 57 is formed in the tapered portion 55, the flared tube portion will be reduced in wall-thickness and also in strength. This also raises another problem in that the flared tube end tends to be cracked by any applied load. FIG. 11 shows such a cracking by 58.

SUMMARY OF THE INVENTION

In order to overcome the above problems in the prior art, the present invention has as an object to provide a plastic coupling for plastic tubing which can prevent the connected tubes from being removed out of the joint body even under any severe load such as a bending load or the like.

To this end, the present invention provides a plastic coupling for plastic tubing comprising a plastic flared connection tube including a tapered portion with an enlarged diameter portion formed therein at the tip thereof, a main joint body including an external thread formed therein around the outer periphery thereof and a tip sleeve portion inserted into the enlarged diameter portion of said connection tube, a cap nut including an internal thread formed therein around the inner periphery thereof and engageable with the external thread of said joint body and a bore receiving said connection tube, and seal means formed between the connection tube and the cap nut and said seal means being characterized by a groove annulus formed between the first circumferential groove on the outer periphery of said enlarged diameter portion and the second circumferential groove on the inner periphery of said cap nut when the cap nut is mounted on said joint body, and an enlargeable split ring having an internal diameter smaller than the external diameter of said enlarged diameter portion and loosely fitted into said second groove, said split ring being adapted to slide on the enlarged diameter portion of said connection tube to said first groove until said split ring falls within said first groove and is located within said groove annulus when said cap nut is mounted on said joint body.

If the connection tube is moved by any external pulling force applied thereto in the longitudinal direction in such an arrangement, the connection tube will be latched against the nut through the split ring disposed within the groove annulus. This can reliably prevent the connection tube from being removed out of the joint body.

Although the first groove defining in part the groove annulus is formed in the enlarged diameter portion of the tip tapered portion which is susceptible to deformation due to being loaded or heat, the plastic coupling of the present invention may be of a relatively simplified structure that is more resistant to bending load and heat.

DETAILED DESCRIPTION OF THE PREFERRED EMBODIMENT

Referring to FIGS. 1 through 4, a plastic coupling 1 constructed in accordance with the present invention comprises a main joint body 3 having a central fluid passage 2, a pair of cap nuts 5 screwed over the joint body 3 at the opposite ends, each of said cap nuts 5 having a tube end receiving bore 4 aligned with the fluid passage 2 of the joint body 3, and a plastic connection tube 7 having an enlarged diameter portion 6 with a flared tip end.

Figure 1:
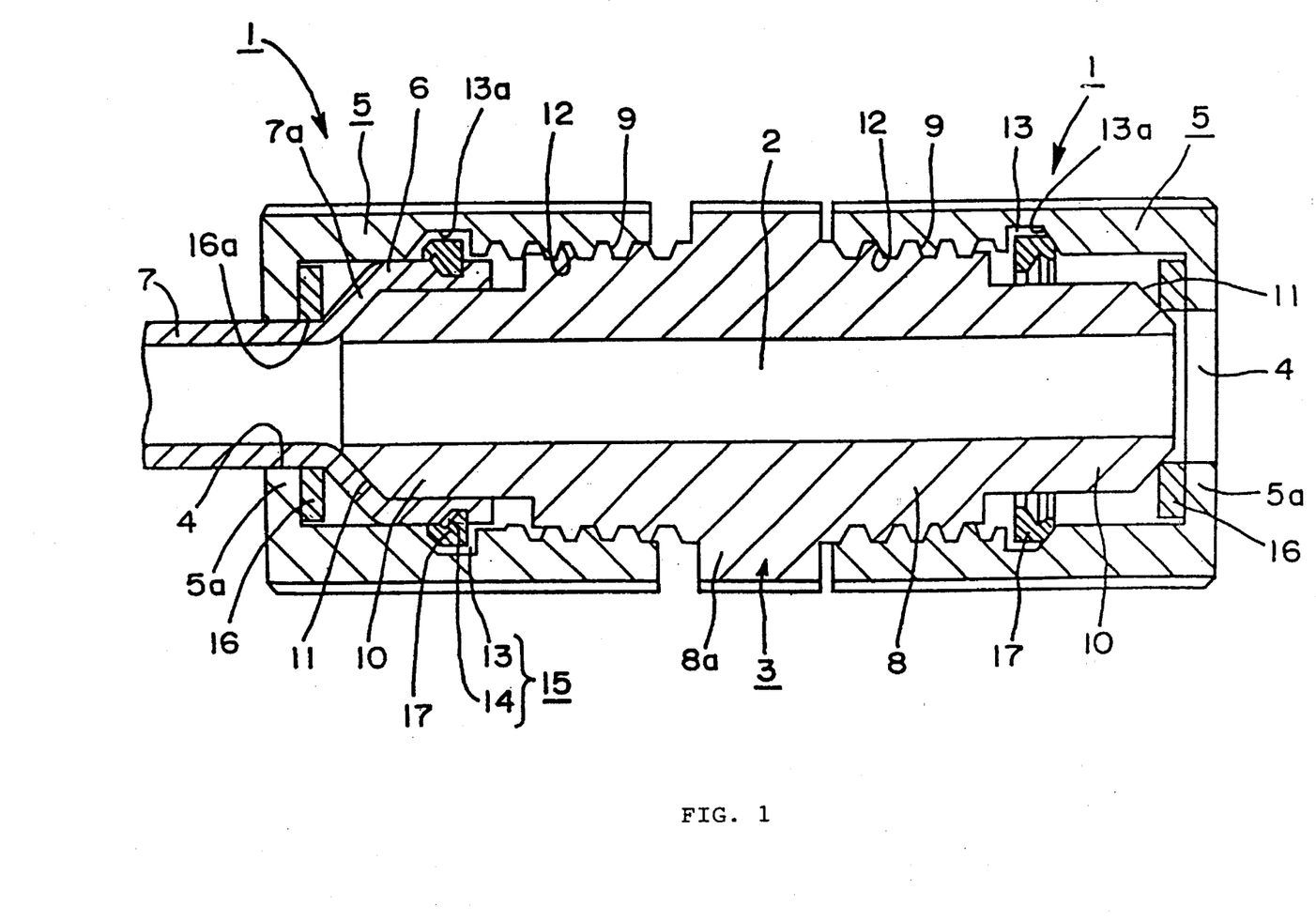
FIG. 1 is a longitudinal cross-section of one embodiment of a plastic coupling for plastic tubing constructed in accordance with the present invention.

The joint body 3 may be molded of a synthetic resin such as PTFE (tetrafluoroethylene), PFA (tetrafluoroethyleneperfluoroalkyl vinyl either) or the like. The main body 8 has an externally extending flange 8a formed therein around the outer periphery at the middle point between the opposite ends. The outer periphery of the main body 8 is formed with male or external threads 9 adjacent to the opposite sides of the flange 8a. The main body 8 further includes sleeve portions 10 which externally extend from the opposite ends of the main body 8 in the longitudinal direction. The tip end of each of the sleeve portions 10 is chamfered to form a tapered face 11.

Figure 4:
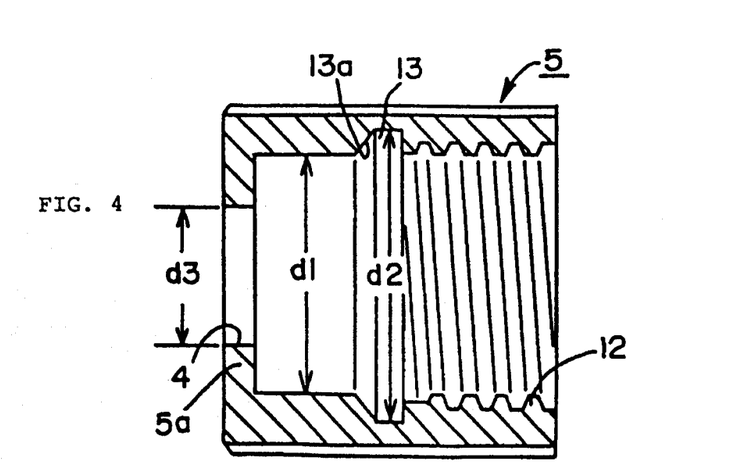
FIG. 4 is a longitudinal section view of a tube clamping nut.

The cap nuts 5 may be molded of the same synthetic resin as in the joint body 3. As shown in FIG. 4, each of the cap nuts 5 is in the form of a cap which is closed at one end by an end wall 5a, the end wall having a tube receiving opening 4 formed therein. The other opened end of the nut 5 includes a female or internal thread 12 formed therein around the inner periphery thereof, the internal thread being adapted to be screwed onto the external thread 9 of the joint body 3. The cap nut 5 further includes a circumferential groove 13 formed therein around the inner periphery thereof adjacent to the end of the internal thread 12. The groove 13 includes a tapered sidewall portion 13a located on the side of the end wall 5a, the tapered sidewall portion being inclined radially externally toward the bottom of the groove 13. The tapered sidewall portion 13a serves as an engagement surface which will be engaged by the corresponding part of a split ring 17 when a longitudinal force is applied to the connection tube 7.

Figure 3:
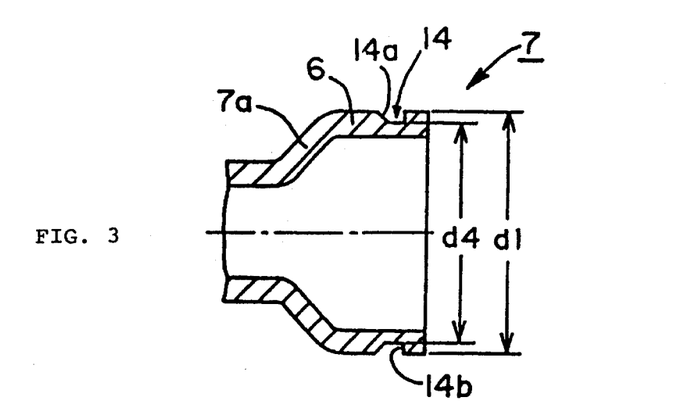
FIG. 3 is a detail section view of the end portion of a plastic tube adapted for the coupling.

The connection tube 7 may be molded of the same synthetic resin as in the joint body 3 and nut 5. The connection tube 7 includes a circumferential groove 14 formed therein around the outer periphery thereof at a position corresponding to the groove 13 of the nut 5, as shown in FIG. 3. The groove 14 defines a groove annulus 15 with the groove 13. The connection tube 7 has an enlarged diameter portion 6 with a tapered portion 7a. The circumferential groove 14 has a tapered sidewall portion 14a on the side of the tapered portion 7a in the enlarged diameter portion 6, the tapered sidewall portion 14a being inclined radially inwardly toward the bottom of the groove 14. The other sidewall 14b of the groove 14 is perpendicular to the bottom wall thereof. The sidewall portion 14b serves as an engagement surface engaged by the corresponding part of the split ring 17 when the longitudinal force is applied to the connection tube 7.

The machining and assembling of the connection tube 7 into the nut is normally accomplished by inserting the connection tube into the nut 5 after the groove 14 has been formed in the connection tube. The connection tube 7 is then flared to form the tapered portion 7a as well as the enlarged diameter portion 6. This process is similar to that of the prior art.

Figure 2:
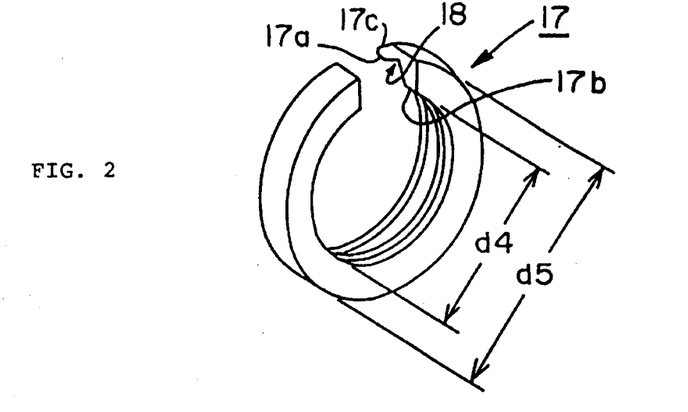
FIG. 2 is a perspective view showing the outline of a split ring.
Figure 5:
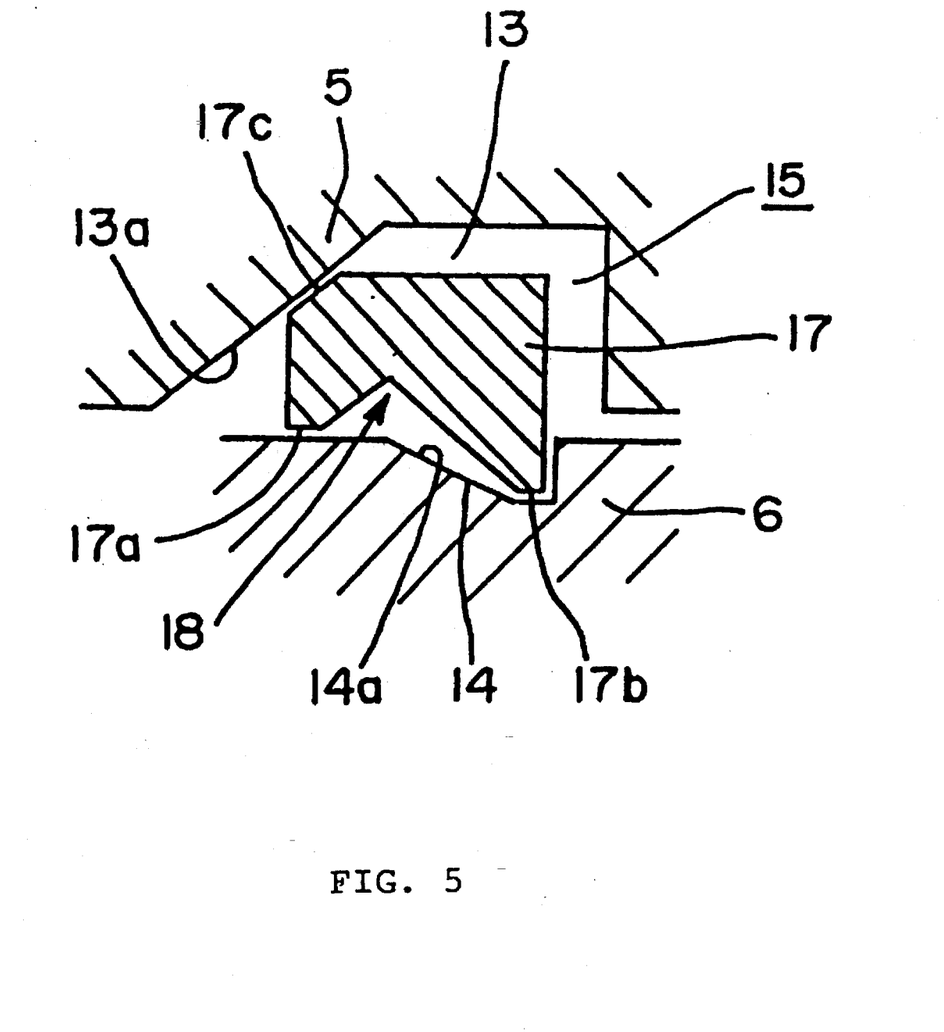
FIG. 5 is an enlarged detail section view illustrating the relation of the assembled parts as in FIG. 1.

When a nut 5 is to be assembled into a connection tube 7, the split ring 17 as well as a the ring 16 are disposed within the nut 5. Both the rings 16 and 17 are preferably formed of reinforced fluoroplastic or the like, but may be formed of the same synthetic resin as in the joint body 3. The reinforcing ring 16 is of a quadrangle configuration having substantially a completely circular cross-section. The ring 16 has a central aperture 6a formed therethrough and having its internal diameter substantially equal to that of the tube receiving opening 4 in the nut 5. The reinforcing ring 16 functions to improve the sealing property, but is it not essential in the present invention. On the other hand, the split ring 17 is in the form of a partially cut away annulus, as shown in FIGS. 2 and 5. The split ring 17 includes a V-shaped groove 18 formed therein around the inner periphery thereof. The split ring 17 further includes inner faces 17a and 17b of larger and smaller diameters formed therein around the inner periphery of the split ring 17 on the opposite sides of the V-shaped groove 18 and an outer tapered face 17c formed in the split ring 17 around the outer periphery thereof. Thus, the smaller inner face 17b has its configuration engageable into the groove 14. The tapered face 17c is inclined to match the tapered sidewall portion 13a of the groove 13. The diameter ($d_4$) Of the smaller inner face 17b in the split ring 17 is substantially equal to the diameter ($d_4$) of the connection tube 7 at the bottom of the groove 14 therein. However, the diameter of the smaller inner face 17b is not limited to such a size, but only required to be smaller than the diameter ($d_1$) of the enlarged diameter portion 6 in the connection tube 7.

Figure 6:
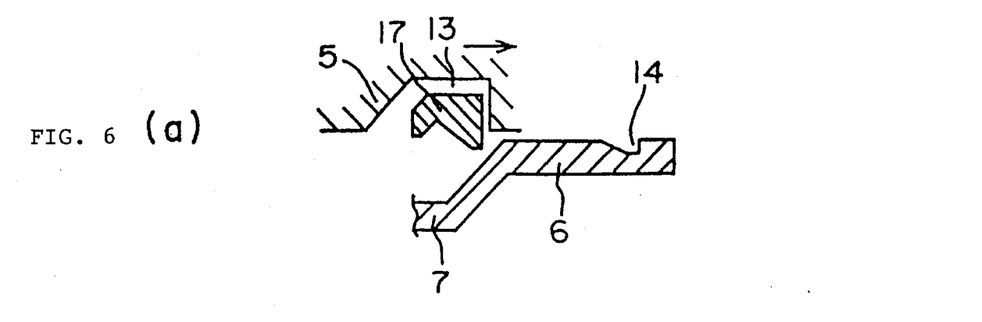
FIGS. 6(a) through (d) are detail diagrammatic views illustrating the operation of the plastic coupling during assembly.

FIG. 5 diagrammatically illustrates the split ring 17 fitted into the groove annulus 15 to prevent the removal of the connection tube 7 out of the joint body as the nut 5 is more toward the connection tube 7. The fixation of the connection tube 7 to the joint body will be described with reference to FIG. 6.

First of all, one sleeve portion 10 in the body 3 is inserted and fitted into the enlarged diameter portion 6 of a connection tube 7 until the tapered face 11 of the sleeve portion 10 is engaged by the tapered portion 7a in the enlarged diameter portion 6 of the connection tube 7.

Next, the nut 5 is moved on the connection tube 7 toward the joint body 3, with the male thread 9 being screwed into the female thread 12. On halfway as the nut 5 is being moved on and along the connection tube 7, the tapered portion 7a of the enlarged diameter portion 6 is engaged by the inner face of the split ring 17 to resiliently deform the split ring 17 so that the notched part thereof will be expanded. The expanded ring 17 then rides on the outer periphery of the enlarged diameter portion 6 to slide on the enlarged diameter portion 6 with the tube fixing nut 5 toward the groove 14 (see FIGS. 6(a) and (b)).

When the nut 5 is moved while screwing the male thread 9 into the female thread 12, the ring 16 is urged against the tapered portion 7a of the enlarged diameter portion 6. As the smaller inner face 17b of the split ring 17 is moved past the tapered sidewall portion 14a of the groove 14, the split ring 17 is snapped back to its original size and then falls onto the bottom of the groove 14. Thus, the smaller inner face 17b engages in the groove 14 and the larger inner face 17a engages the outer periphery of the enlarged diameter portion 6. As a result, the connection is completed (see FIG. 6(c)). When the split ring 17 falls into the groove 14 in such a manner, it generates an impact sound with the inner wall of the groove 14 or the inner sidewall of the groove 13. A user can confirm the positive assembly of the split ring 17 into the groove 14. FIG. 1 shows such a condition. Although FIG. 1 illustrates only one of the connection tubes 7 mounted in the joint body, another connection tube 7 may similarly be mounted into the joint body 3 at the other or right-hand end thereof.

If any external pulling force is applied to the connection tube 7 in the longitudinal direction in such an arrangement, the split ring 17 is biased externally as shown in FIG. 6(c) so that the tapered portion 17c of the split ring 17 is engaged by the inner sidewall 13a of the groove 13, in addition to the engagement of the inner sidewall (engagement surface) 14b of the groove 14 with the split ring 17. Thus, the engagement of the inner sidewall (engagement surface) 13a of the groove 13 with the split ring 17 prevents the connection tube 7 from being removed out of the joint body.

Figure 7:
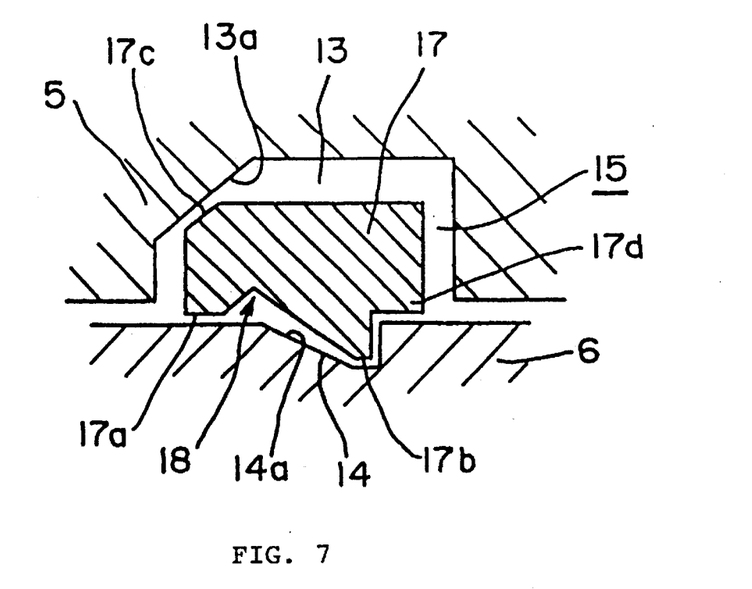
FIG. 7 is a detail section view showing another embodiment of the plastic coupling according to the present invention.
Figure 8:
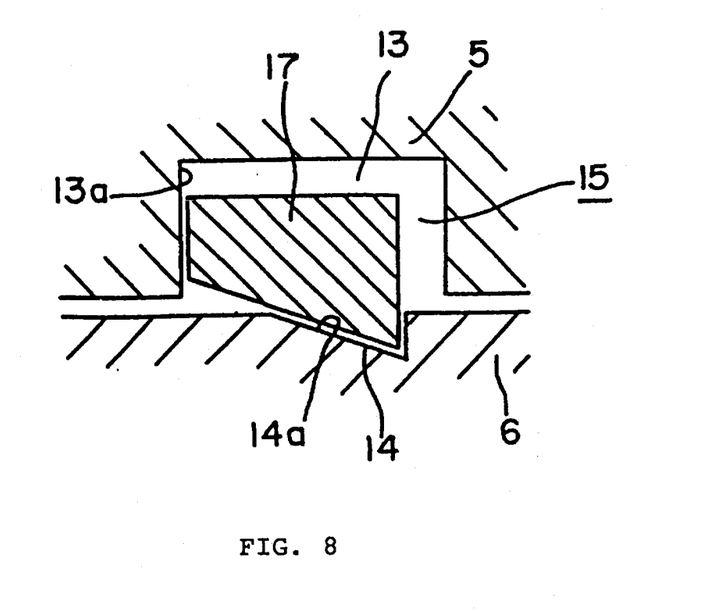
FIG. 8 is a detail section view showing still another embodiment of the plastic coupling according to the present invention.

The grooves 13 and 14 forming the groove annulus 15 and the split ring 17 are not limited to the above configurations, but may be embodied in various other configurations. Namely, the means for preventing the removal of the connection tube out of the joint body may have a smaller inner face engageable in the groove 14 and also two forward and rearward engagement surfaces engaged by the sidewalls of the groove 13 in the nut 5 so that the split ring can move with the nut 5. For example, the plastic coupling may be of such a structure as shown in FIGS. 7 or 8. With the structure of FIG. 7, the split ring 7 includes a side extension 17d formed therein on one side. With the structure of FIG. 8, the split ring 17 has an inner tapered face and flat side faces while the sidewalls 13a of the groove 13 are also flat.

As will be apparent, the plastic coupling of the present invention can reliably prevent the connection tube from being removed out of the joint body by causing the connection tube to engage the nut through the split ring disposed within the groove annulus as the connection tube is pulled externally in the longitudinal direction. The plastic coupling can easily be assembled. Particularly, the sound generated when the split ring is moved into the predetermined positions on the connection can prevent the connection tube from being wrongly assembled into the joint body.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. A high temperature resistant plastic coupling for plastic tubing comprising, a main joint body comprising a central fluid passage and a tip sleeve portion with an outer periphery, the main joint body also comprising an external thread adjacent to the tip sleeve portion, a plastic connection tube comprising a central passage with the approximate size of said central fluid passage of the main joint body, the plastic connection tube also comprising a flared end portion received onto the outer periphery of the tip sleeve portion of the main joint body in tight fitting relation, the flared end portion having an outer periphery with a first circumferential groove formed therein, a cap nut comprising an outer end portion with a bore therethrough receiving the plastic connection tube therethrough and also comprising an open inner end portion with an inner periphery extending along and embracing the flared end portion of the plastic connection tube and said first circumferential groove thereof, said inner periphery of the cap nut also comprising an internal thread threaded onto the external thread of the main joint body, the inner periphery of the cap nut also comprising a second circumferential groove positioned directly opposite said first circumferential groove in the flared end portion of the plastic connection tube, and a resiliently deformable split ring residing in said first circumferential groove and embracing the flared end portion of the plastic connection tube, said split ring also residing in the second circumferential groove of the cap nut, the split ring having an inner periphery with a diameter less than the diameter of the outer periphery of the flared end portion of the plastic connection tube.

2. A high temperature resistant plastic coupling according to claim 1 wherein the cap nut defines a pair of sidewalls of the second circumferential groove, one of said sidewalls being adjacent the inner end portion of the cap nut, and the other of said sidewalls being adjacent the outer end portion of the cap nut and being tapered and in confronting relation with the split ring to engage and urge the split ring to be deformed radially inwardly against the flared end portion of the plastic connection tube to tightly squeeze the flared end portion of the plastic connection tube against the tip sleeve portion of the main joint body in the event that the plastic connection tube tends to be pulled off the tip sleeve portion of the main joint body.

3. A high temperature resistant plastic coupling according to claim 1 wherein the flared end portion of the plastic connection tube comprises a tapered portion and also comprises an end of the tube adjacent the threads of the main joint body and of the cap nut, the first circumferential groove being disposed between said tapered portion and said end of the plastic connection tube, the flared end portion of the plastic connection tube comprises a pair of sidewalls of the first circumferential groove, one of said sidewalls being adjacent the end of the plastic connection tube and the other of said sidewalls being adjacent the tapered portion and being tapered to cause the split ring to be deformed radially outwardly to a larger diameter to slide over the outer periphery of the tapered end portion of the plastic connection tube when the cap nut is threadably moved longitudinally away from the main joint body and along said flared end portion of the plastic connection tube to move the split ring over the tapered sidewall of the first circumferential groove.

4. A high temperature resistant plastic coupling according to claim 1 wherein said split ring residing in said first circumferential groove of the plastic connection tube bears radially inwardly against the flared end portion of the plastic connection tube to restrict any undesired enlargement of the diameter of the flared end portion of the plastic connection tube.

5. A high temperature resistant plastic coupling according to claim 1 wherein said deformable split ring has an outer periphery being spaced radially inwardly from the adjacent portions of the cap nut while the split ring resides in said second circumferential groove of the cap nut to permit the split ring to be enlarged as it slides over the outer periphery of the flared end portion of the plastic connection tube.

* * * * *